(12) United States Patent
Pfadler et al.

(10) Patent No.: US 11,545,034 B2
(45) Date of Patent: Jan. 3, 2023

(54) METHODS, COMPUTER PROGRAMS, APPARATUSES, A VEHICLE, AND A TRAFFIC ENTITY FOR UPDATING AN ENVIRONMENTAL MODEL OF A VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiengesellschaft

( * ) Notice: Subject to any disclaimer, the term of this patent is extended or adjusted under 35 U.S.C. 154(b) by 155 days.

(21) Appl. No.: 16/939,681

(22) Filed: Jul. 27, 2020

(65) Prior Publication Data

US 2021/0027628 A1 Jan. 28, 2021

(30) Foreign Application Priority Data

Jul. 26, 2019 (EP) .................... 19188609

(51) Int. Cl.
*G08G 1/16* (2006.01)
*H04W 4/46* (2018.01)
(Continued)

(52) U.S. Cl.
CPC ........... *G08G 1/163* (2013.01); *G05D 1/0246* (2013.01); *G08G 1/096791* (2013.01); *H04W 4/46* (2018.02)

(58) Field of Classification Search
CPC ... G08G 1/163; G08G 1/096791; H04W 4/46; G05D 1/0246
See application file for complete search history.

(56) References Cited

U.S. PATENT DOCUMENTS 7,979,173 B2 7/2011 Breed
8,255,144 B2 8/2012 Breed et al.
(Continued)

FOREIGN PATENT DOCUMENTS

KR 20180036268 A 4/2018
WO 2017192358 A1 11/2017

OTHER PUBLICATIONS

Search Report for European Patent Application No. 19188609.2; dated Feb. 14, 2020.
(Continued)

*Primary Examiner* — Luis A Martinez Borrero
(74) *Attorney, Agent, or Firm* — Barnes & Thornburg, LLP

(57) ABSTRACT

Methods, computer programs, apparatuses, a transportation vehicle, and a traffic entity for updating an environmental model at a transportation vehicle. The method for a transportation vehicle and for updating an environmental model of the transportation vehicle includes obtaining an environmental model of the transportation vehicle, the environmental model having static and dynamic objects in the environment of the transportation vehicle along at least a part of the trajectory of the transportation vehicle; assigning information related to correctness probabilities at least to dynamic objects of the environmental model; determining at least one dynamic object for which the information related to the correctness probability indicates a correctness probability below a threshold; and transmitting a broadcast message to the environment to request further information on the at least one dynamic object.

17 Claims, 5 Drawing Sheets

(51) Int. Cl.
*G05D 1/02* (2020.01)
*G08G 1/0967* (2006.01)

(56) References Cited

U.S. PATENT DOCUMENTS

| | | | |
|---|---|---|---|
| 8,260,482 B1 | 9/2012 | Szybalski et al. | |
| 9,896,100 B2 | 2/2018 | Gordon et al. | |
| 10,109,198 B2* | 10/2018 | Qiu | G06V 10/764 |
| 10,229,590 B2* | 3/2019 | Du | G08G 1/09 |
| 10,349,011 B2* | 7/2019 | Du | G06V 20/56 |
| 10,613,547 B2* | 4/2020 | Riess | H04L 67/12 |
| 10,693,872 B1* | 6/2020 | Larson | G06F 21/31 |
| 10,713,950 B1* | 7/2020 | Newman | G06Q 50/265 |
| 10,730,512 B2* | 8/2020 | Kutila | G05D 1/0231 |
| 11,206,677 B2* | 12/2021 | Brugman | H04W 4/40 |
| 2016/0139594 A1 | 5/2016 | Okumura et al. | |
| 2017/0124781 A1 | 5/2017 | Douillard et al. | |
| 2018/0067463 A1* | 3/2018 | Oder | G05D 1/0259 |
| 2018/0093631 A1 | 4/2018 | Lee et al. | |
| 2018/0261095 A1* | 9/2018 | Qiu | G08G 1/166 |
| 2018/0314247 A1* | 11/2018 | Sun | B60W 30/00 |
| 2018/0349785 A1* | 12/2018 | Zheng | G05D 1/0088 |
| 2019/0049992 A1* | 2/2019 | Riess | G05D 1/0276 |
| 2019/0051168 A1* | 2/2019 | Du | G08G 1/0112 |
| 2019/0052842 A1* | 2/2019 | Du | H04N 7/18 |
| 2019/0138007 A1* | 5/2019 | Baghsorkhi | G05D 1/0278 |
| 2019/0143967 A1* | 5/2019 | Kutila | B60W 50/14 |
| | | | 701/23 |
| 2020/0128372 A1* | 4/2020 | Zhang | H04W 4/44 |
| 2020/0178221 A1* | 6/2020 | Byun | H04W 4/08 |
| 2020/0284883 A1* | 9/2020 | Ferreira | G01S 17/10 |
| 2021/0065551 A1* | 3/2021 | Manohar | G08G 1/164 |
| 2021/0122395 A1* | 4/2021 | Pfadler | G08G 1/0133 |
| 2021/0350145 A1* | 11/2021 | Park | G06T 7/70 |
| 2022/0027642 A1* | 1/2022 | Shambik | G06T 7/70 |
| 2022/0126864 A1* | 4/2022 | Moustafa | B60W 60/001 |

OTHER PUBLICATIONS

Office Action for Korean Patent Application No. 10-2020-0091634; dated May 24, 2022.
Office Action; Korean Patent Application No. 10-2020-0091634; dated Aug. 24, 2022.

* cited by examiner

METHODS, COMPUTER PROGRAMS, APPARATUSES, A VEHICLE, AND A TRAFFIC ENTITY FOR UPDATING AN ENVIRONMENTAL MODEL OF A VEHICLE

PRIORITY CLAIM

This patent application claims priority to European Patent Application No. 19188609.2, filed 26 Jul. 2019, the disclosure of which is incorporated herein by reference in its entirety.

SUMMARY

Illustrative embodiments relate to methods, computer programs, apparatuses, a transportation vehicle, and a traffic entity for updating an environmental model at a transportation vehicle, more specifically, but not exclusively, to a concept for reducing uncertainties in an environmental model at a transportation vehicle.

BRIEF DESCRIPTION OF THE DRAWINGS

Disclosed embodiments will be described by way of example only, and with reference to the accompanying figures, in which.

DETAILED DESCRIPTION

Figure 1:
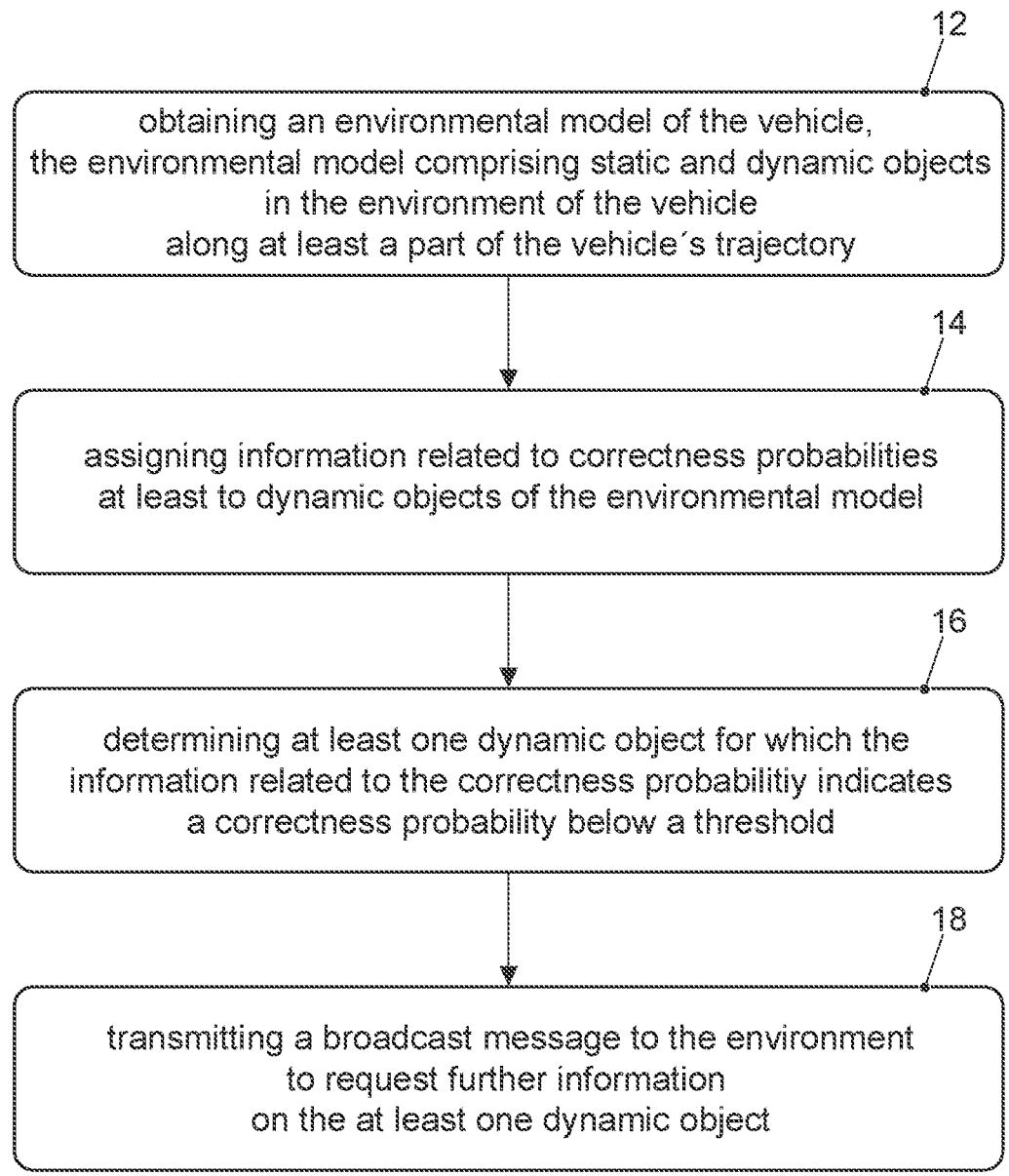
FIG. 1 illustrates a block diagram of an exemplary embodiment of a method for a transportation vehicle and for updating an environmental model of the transportation vehicle.

In the scope of autonomous driving, especially in higher automation levels such as L4 and L5 (high automation, full automation), the perception of the environment is critical. Even if an autonomous transportation vehicle is supported by tele-operated driving, where a transportation vehicle is driven by a remote-control center which is physically located elsewhere, the operator may require input data regarding the surrounding environment.

There are cases in which transportation vehicles require input from the outside, for instance, if a sensor malfunction occurs, a field of view is occluded, or an uncertainty in object recognition occurs. One known solution for this problem is sensor sharing, in which transportation vehicles share their environmental models on the basis of raw data or already detected objects. In both cases, the amount of sent data can overload the channel.

Document U.S. Pat. No. 7,979,173 B2 describes a concept for enabling semi-autonomous or autonomous travelling of a transportation vehicle. A transportation vehicle travel management system is provided which monitors the location of transportation vehicles in a travel lane and the location of the travel lane, creating dedicated travel lanes for transportation vehicles equipped with the transportation vehicle travel management system, and managing travel of transportation vehicles in the dedicated travel lanes to maximize travel speed of the transportation vehicles and minimize collisions between the transportation vehicles. The travel management may entail establishing and maintaining communications between the transportation vehicles with the movement of the transportation vehicles being coordinated to enable a minimal distance between adjacent transportation vehicles in the dedicated travel lanes. Entry into the dedicated travel lanes is optimally restricted only to transportation vehicles equipped with the transportation vehicle travel management system.

Document WO 2017/192358 A1 discloses systems and methods related to dynamic map layers for autonomous or semi-autonomous transportation vehicles and allowing realtime (e.g., latency of less than one second) updates utilizing a plurality of available surrounding sensors (e.g., collaborative sensors) including roadside sensors and sensors of other nearby transportation vehicles. When a transportation vehicle detects an obstruction to a field of view of a sensor, the transportation vehicle may request sensor data from other transportation vehicles to fill the gap in sensor data of the transportation vehicle. This allows the transportation vehicle driver or transportation vehicle illumination system to be focused on the obstructed area.

Document U.S. Pat. No. 8,255,144 B2 describes a system and a method for conveying data between transportation vehicles. Document US 2016/0139594 A1 discloses computer devices, systems, and methods for remotely operating an autonomous passenger transportation vehicle. Document U.S. Pat. No. 9,896,100 B2 describes a computer-implemented method, system, and/or computer program product, which automatically provide spatial separation between a self-driving transportation vehicle (SDV) operating in an autonomous mode and another transportation vehicle on a roadway based on an emotional state of at least one occupant of the SDV. Document U.S. Pat. No. 8,260,482 B1 discloses a concept in which a passenger in an automated transportation vehicle may relinquish control of the transportation vehicle to a control computer when the control computer has determined that it may maneuver the transportation vehicle safely to a destination. The passenger may relinquish or regain control of the transportation vehicle by applying different degrees of pressure, for example, on a steering wheel of the transportation vehicle. Document KR 10 1891612 describes an autonomous transportation vehicle communicating with other autonomous transportation vehicles.

There is a demand for an improved communication concept for autonomously driving transportation vehicles.

Disclosed embodiments are based on the finding that teleoperated driving (remote control) is at least partially motivated by automated transportation vehicles encountering difficulties in identifying and classifying objects. Even with a teleoperated driving based solution, the control/command center may require the support of the autonomous transportation vehicle for generating and verifying trajectories. It is a finding that such help can be provided by other transportation vehicles or infrastructure in a fast and efficient way without sharing too much data. It is a basic finding that a signaling overhead between transportation vehicles can be reduced by specifying information needed in a request message to avoid being provided with redundant or useless information.

A method for a transportation vehicle and for updating an environmental model of the transportation vehicle is provided by disclosed embodiments. The method comprises obtaining an environmental model of the transportation vehicle. The environmental model comprises static and dynamic objects in the environment of the transportation vehicle along at least a part of the transportation vehicle's trajectory. The method further comprises assigning information related to correctness probabilities at least to dynamic objects of the environmental model and determining at least one dynamic object for which the information related to the correctness probability indicates a correctness probability below a threshold. The method also comprises transmitting a broadcast message to the environment to request further information on the at least one dynamic object. Efficient use of communication resources can be made by specifying particular objects in a request rather than sharing entire environmental models between transportation vehicles. Moreover, by selecting objects on which further information is requested based on confidence (correctness probability) communication bandwidth can be saved by avoiding communication about objects for which a confidence suffices.

In further disclosed embodiments, the method may comprise receiving at least one response message from another transportation vehicle or a traffic infrastructure entity in the environment with further information related the at least one dynamic object with a higher probability of correctness. The environmental model at the transportation vehicle can therewith be improved in that a higher certainty/confidence can be achieved for the at least one dynamic object.

The broadcast message may comprise at least one element of the group of a description of the at least one dynamic object, an identification of the at least one dynamic object, information related to a property of the at least one dynamic object for which further information is requested, information related to a relative or an absolute location of the at least one dynamic object, information related to a specific area further information is requested on, and information related to the transportation vehicle's trajectory. By allowing more specific information in the broadcast/request message communication can be made more efficient as the request and its potential response can be tailored to the information needed. Redundancies in the communication/signaling may be reduced.

In some disclosed embodiments the method may comprise transmitting the broadcast message if the at least one dynamic object conflicts with a future path of the transportation vehicle. Restricting such communication only to objects with a potential conflict may further reduce the number of messages and contribute to keeping a signaling overhead reasonable. The method may further comprise maintaining a list at least with dynamic objects of the environment, wherein the list comprises information related to an object detection probability and information related to a probability to a future conflict of the path of the transportation vehicle with the object. A list may enable an efficient monitoring of the environment at the transportation vehicle.

The broadcast message may comprise information related to a future trajectory of the transportation vehicle for which the environmental model indicates no conflicting objects with a certain correctness probability. The request for further information on the at least one dynamic object may seek a warning if there is a conflicting object on the trajectory. The broadcast message may be used to have a detected conflict-free pathway verified by one or more other transportation vehicles or traffic entities in the environment.

Disclosed embodiments also provide a method for a traffic entity and for updating an environmental model at a transportation vehicle. The method comprises obtaining information related to an environmental model. The environmental model comprises static and dynamic objects in an environment of the traffic entity. The method further comprises receiving a broadcast message relating to a request for further information on at least one dynamic object in an environment of the transportation vehicle and providing further information one the at least one dynamic object in the environment of the transportation vehicle if available from the environmental model. By providing a response to a request only if further information is available from its own environmental mode, signaling overhead can be kept reasonable. At the requesting transportation vehicle the information on the at least one dynamic object may gain further confidence.

The method at the traffic entity may comprise assigning information related to correctness probabilities at least to the dynamic objects of the environmental model (its own environmental model). That way, confidence levels can be made available at the traffic entity. The method may comprise receiving information related to a probability of correctness of information related to the at least one dynamic object at the transportation vehicle. The method comprises providing further information on the at least one dynamic object in the environment of the transportation vehicle if a probability of correctness of the further information on the at least one dynamic object available from the environmental model is higher than the probability of correctness of information related to the at least one dynamic object at the transportation vehicle. By responding only if the correctness probability at the requestor can be approved, the signaling overhead can be further reduced.

The broadcast message may comprise information related to a future trajectory of the transportation vehicle for which no conflicting objects are present with a certain correctness probability in some disclosed embodiments. The further information on the at least one dynamic object may then comprise a warning if there is a conflicting object on the trajectory with a certain probability. Disclosed embodiments may enable a simple warning/verification mechanism if a detected pathway has some uncertainty about whether there are conflicting objects or not.

An apparatus for a transportation vehicle and configured to update an environmental model of the transportation vehicle is a further exemplary embodiment. The apparatus comprises one or more interfaces for communicating with one or more transportation vehicles and/or traffic entities. The apparatus further comprises a control module configured to carry out one or more of the methods described herein. Another exemplary embodiment is a transportation vehicle comprising the apparatus. An apparatus for a traffic entity and configured to update an environmental model at a transportation vehicle is yet another exemplary embodiment. The apparatus comprises one or more interfaces for communicating with one or more transportation vehicles and/or traffic entities. The apparatus comprises a control module configured to carry out one or more of the methods described herein. Further exemplary embodiments are a transportation vehicle or traffic infrastructure comprising the apparatus for the traffic entity. A system with at least one exemplary embodiment of each of the above apparatuses and likewise a system method comprising at least one exemplary embodiment of each of the above methods are further disclosed embodiments.

Disclosed embodiments further provide a computer program having a program code for performing one or more of the above-described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the disclosed embodiments, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for a transportation vehicle and for updating an environmental model of the transportation vehicle. The environmental model may be a digital model of the environment of the transportation vehicle, which can be based on sensor and other data. For example, a transportation vehicle can be equipped with multiple sensors, such as visual/optical (camera), radar, ultrasonic, etc. A transportation vehicle may model its surroundings using this sensor data and potentially data communicated among the traffic participants. At least in some exemplary embodiments such a model may be based on known static data, e.g., as map data comprising a course of one or more roads, intersections, traffic infrastructure (lights, signs, crossings, etc.), buildings, etc. Such a basic layer for the environmental model may be complemented by dynamic or moving objects detected through sensor data or by communicating with other transportation vehicles.

The method 10 comprises obtaining 12 an environmental model of the transportation vehicle. The environmental model comprises static and dynamic objects in the environment of the transportation vehicle along at least a part of the transportation vehicle's trajectory. Such a part of the trajectory may be, for example, the part the transportation vehicle is planning to travel in the next 30 s, 1 minutes, 5 minutes, 10 minutes, etc. A dynamic object is one that is not permanently static/fixed such as other road participants, pedestrians, transportation vehicles, but also semi-static objects such as components of a moving construction side, traffic signs for road or lane narrowing, etc.

The method 10 further comprises assigning 14 information related to correctness probabilities at least to dynamic objects of the environmental model. For example, such dynamic objects may be other transportation vehicles, pedestrians, bicycles, road participants, etc. When determining the environmental model not all objects in the model are determined with the same confidence. There are objects for which a higher certainty can be achieved than for others. For example, if multiple sensors can identify or confirm a certain object its presence and/or state of movement can potentially be determined with a higher confidence compared to a case in which only data from a single sensor is indicative of an object.

The method 10 further comprises determining 16 at least one dynamic object for which the information related to the correctness probability indicates a correctness probability below a threshold. For example, if there is an uncertainty on whether an object is really present or on a direction it is heading, such uncertainty can be determined. The method 10 further comprises transmitting 18 a broadcast message to the environment to request further information on the at least one dynamic object. Disclosed embodiments may allow requesting specific information on a certain object. By using a broadcast message, multiple potential responders can be addressed in the environment with a single message.

Figure 2:
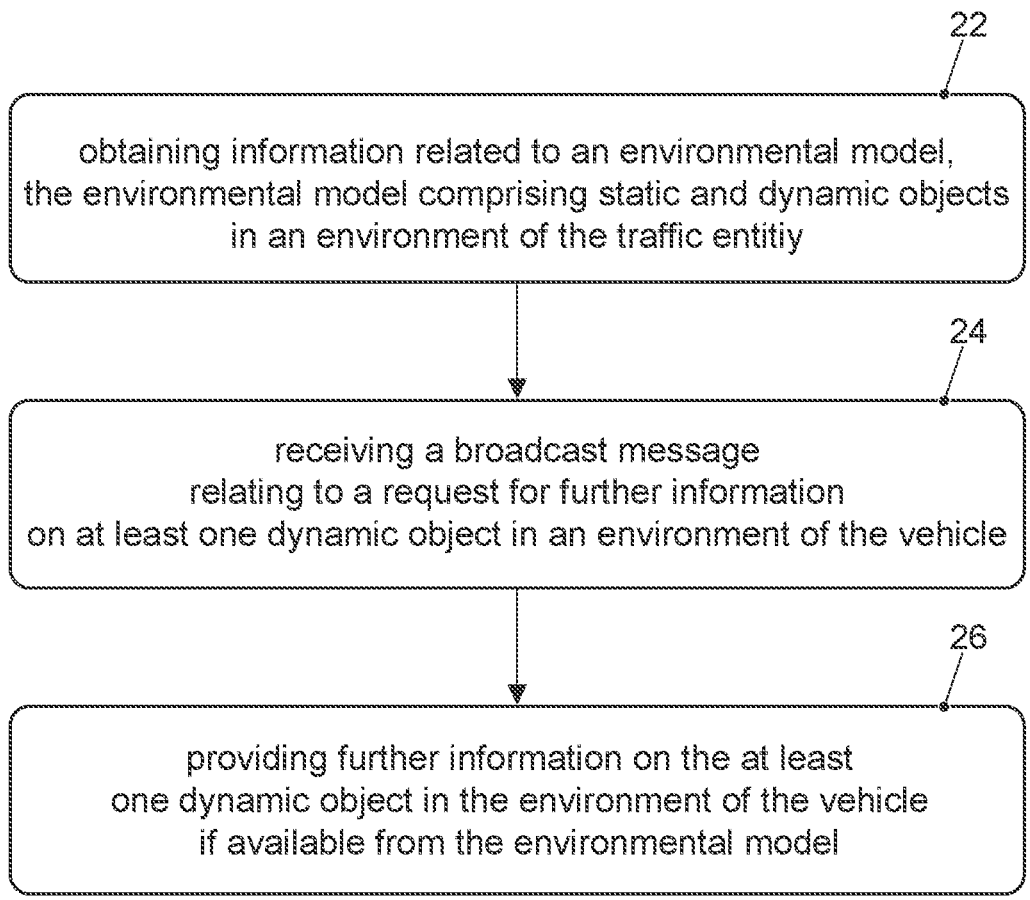
FIG. 2 illustrates a block diagram of an exemplary embodiment of a method for a traffic entity and for updating an environmental model at a transportation vehicle.

FIG. 2 illustrates a block diagram of an exemplary embodiment of a method 20 for a traffic entity and for updating an environmental model at a transportation vehicle. A traffic entity may be another transportation vehicle or an entity of traffic infrastructure (traffic light, traffic sign, railroad crossing, etc.). The method 20 comprises obtaining 22 information related to an environmental model. The environmental model comprises static and dynamic objects in an environment of the traffic entity. The environmental model may be obtained in a similar way as described above, e.g., using sensor data, communicated data, predefined data, etc.

The method 20 comprises receiving 24 a broadcast message relating to a request for further information on at least one dynamic object in an environment of the transportation vehicle. Hence, the traffic entity is corresponding to the above description and receives the broadcast message with the request. The method 20 further comprises providing 26 or transmitting further information on the at least one dynamic object in the environment of the transportation vehicle if available from the environmental model. Hence, in case such information is available the traffic entity responds to the transportation vehicle's broadcast message.

Figure 3:
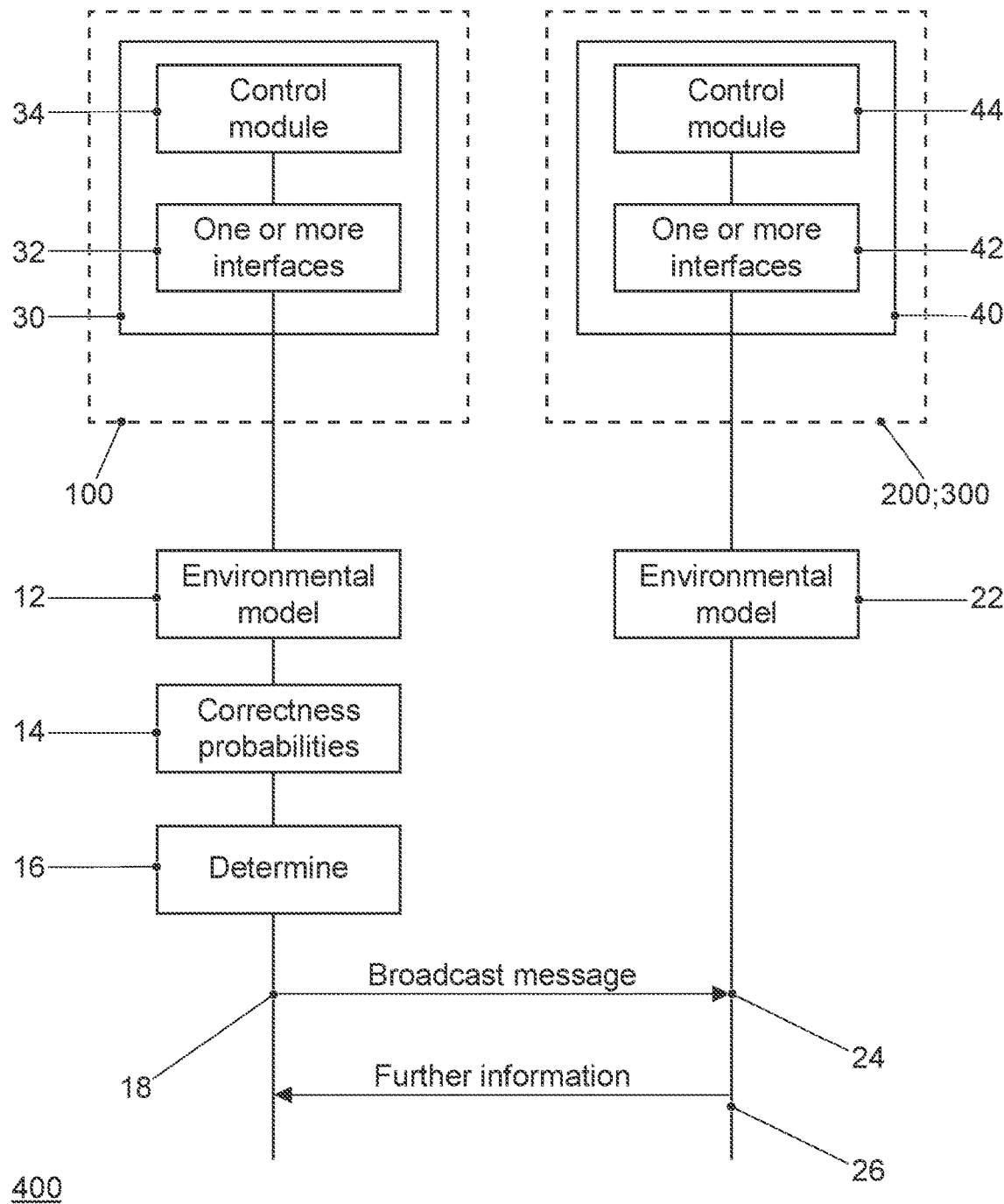
FIG. 3 illustrates block diagrams of an exemplary embodiments for apparatuses for a transportation vehicle and for a traffic entity, an exemplary embodiment of a transportation vehicle, an exemplary embodiment of a traffic entity, and an exemplary embodiment of a system.

FIG. 3 illustrates block diagrams of exemplary embodiments for apparatuses 30, 40 for a transportation vehicle 100, 200 and for a traffic entity 300. FIG. 3 further illustrates an exemplary embodiment of a transportation vehicle 100, an exemplary embodiment of a traffic entity 200, 300, and an exemplary embodiment of a system 400.

FIG. 3 shows an apparatus 30 for a transportation vehicle 100. The apparatus 30 is configured to update an environmental model of the transportation vehicle 100. The apparatus 30 comprises one or more interfaces 32 for communicating with one or more traffic entities. As outlined above such a traffic entity may be another transportation vehicle 200 or traffic infrastructure 300. The apparatus 30 further comprises a control module 34, which is coupled to the one or more interfaces 32. The control module 34 is further configured to carry out one of the methods 10 described herein. FIG. 3 further illustrates an apparatus 40 for a traffic entity 200, 300 and configured to update an environmental model at a transportation vehicle 100. The apparatus 40 comprises one or more interfaces 42 for communicating with one or more transportation vehicles 100 and traffic entities 300. The apparatus 40 further comprises a control module 44, which is coupled to the one or more interfaces 42. The control module 44 is further configured to carry out one of the methods 20 described herein. FIG. 3 further depicts as optional components further disclosed embodiments of a transportation vehicle 100 comprising an exemplary embodiment of the apparatus 30, and a transportation vehicle 200 or traffic infrastructure 300 comprising an exemplary embodiment of apparatus 40. A system 400 comprising at least one exemplary embodiment of the apparatus 30 and at least one exemplary embodiment of the apparatus 40 is yet another disclosed embodiment.

The apparatuses 30, 40, the transportation vehicles 100, 200 and the network component 100 may communicate through a mobile communication system 400. The mobile communication system 400, as shown in FIG. 3, may, for example, correspond to one of the Third Generation Partnership Project (3GPP)-standardized mobile communication networks, where the term mobile communication system is used synonymously to mobile communication network. The messages (broadcast message, further information provided upon request) may hence be communicated through the mobile communication system 400, e.g., using direct communication between the respective entities.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/transportation vehicles. A base station transceiver can be operable or configured to communicate with one or more active mobile transceivers/transportation vehicles and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100, 200, 300 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver, transportation vehicle, or traffic entity 100, 200, 300 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments, a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatuses 30, 40 may be comprised in a base station, a NodeB, a UE, a relay station, or any service coordinating network entity in disclosed embodiments. It is to be noted that the term network component may comprise multiple sub-components, such as a base station, a server, etc.

In disclosed embodiments, the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 34 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information, further information messages, etc.

As shown in FIG. 3 the respective one or more interfaces 32, 42 are coupled to the respective control modules 34, 44 at the apparatuses 30, 40. In disclosed embodiments, the control modules 34, 44 may be implemented using one or more processing units, one or more processing devices, any method or mechanism for processing, such as a processor, a computer or a programmable hardware component being operable with accordingly adapted software. In other words, the described functions of the control modules 32, 44 may as well be implemented in software, which is then executed on one or more programmable hardware components. Such hardware components may comprise a general-purpose processor, a Digital Signal Processor (DSP), a micro-controller, etc.

FIG. 3 also shows an exemplary embodiment of a system 400 comprising disclosed embodiments of UEs/transportation vehicles/traffic entities 100, 200, 30. In exemplary embodiments, communication, i.e., transmission, reception or both, may take place among mobile transceivers/transportation vehicles 100, 200, 300 directly. Such communication may make use of a mobile communication system 400. Such communication may be carried out directly, e.g., by Device-to-Device (D2D) communication. Such communication may be carried out using the specifications of a mobile communication system 400. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 32, 42 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

As further illustrated in FIG. 3, the methods 10, 20 may be carried out at the apparatuses 30, 40 in transportation vehicles 100, 200. In an exemplary embodiment a transportation vehicle 100 obtain 12 an environmental model and assigns 14 information related to correctness probabilities at least to dynamic objects of the environmental model. It is then determined 16 that there is at least one dynamic object for which the information related to the correctness probability indicates a correctness probability below a threshold. As shown in FIG. 3 transportation vehicle 100 then transmits 18 a broadcast message to the environment to request further information on the at least one dynamic object.

In the scenario depicted in FIG. 3 a nearby transportation vehicle 200 or traffic infrastructure 300 (e.g., a traffic light) also obtains 22 information related to an environmental model, the environmental model for the environment of the nearby transportation vehicle 200 or traffic infrastructure 300. The environmental model also comprises static and dynamic objects in an environment of the traffic entity 200, 300.

The above-mentioned broadcast message is received 24 and relates to the request for further information on the at least one dynamic object in the environment of the transportation vehicle 100. The traffic entity 200, 300 then checks whether it has further information on the at least one dynamic object available and provides 26 the further information on the at least one dynamic object in the environment of the transportation vehicle if available from its own environmental model.

In some exemplary embodiments, the method 20 may further comprise assigning information related to correctness probabilities at least to the dynamic objects of the environmental model. Hence, confidence information for the components of the environmental model may also be determined and maintained at the responding traffic entity 200, 300 (apparatus 40). Furthermore, the requesting transportation vehicle 100 (method 10) may provide information on its own confidence with the broadcast message, e.g., a probability of correctness it already has on the requested information such as on an object's presence, velocity, or direction. The method 20 may then comprise receiving information related to a probability of correctness of information related to the at least one dynamic object at the transportation vehicle 100. The method 20 may then provide further information on the at least one dynamic object in the environment of the transportation vehicle 100 based on a condition. The condition may comprise evaluating an improvement and the further information may be sent if a probability of correctness at the requesting transportation vehicle 100 is increased/improved. If a probability of correctness of the further information on the at least one dynamic object available from its own environmental model is higher than the probability of correctness of information related to the at least one dynamic object at the transportation vehicle 100, the further information is provided. The method 10 may then receive at least one response message from another transportation vehicle 200 or a traffic infrastructure entity 300 in the environment with further information related the at least one dynamic object with a higher probability of correctness. Hence, in some exemplary embodiments such response messages may only be sent if they can provide a confidence improvement at the requestor.

The broadcast message may comprise information related to a future trajectory of the transportation vehicle 100 for which its environmental model indicates no conflicting objects with a certain correctness probability. The request for further information on the at least one dynamic object may then seek a warning if there is a conflicting object on the trajectory from traffic entities 200, 300 in the environment. The further information on the at least one dynamic object may then comprise a warning if there is a conflicting object on the trajectory with a certain probability. Disclosed embodiments may therewith enable a verification mechanism for a potentially clear track of a transportation vehicle 100.

The request or broadcast message may hence relate to specific regions or objects, as well as to the transmission of the driven trajectory.

In addition, transportation vehicles 100, 200, 300 may share some sensor data for determination of environmental models. If uncertainties occur, specific messages according to an exemplary embodiment can be used to improve the environmental model, e.g., for object identification, object tracking, etc.

Figure 4:
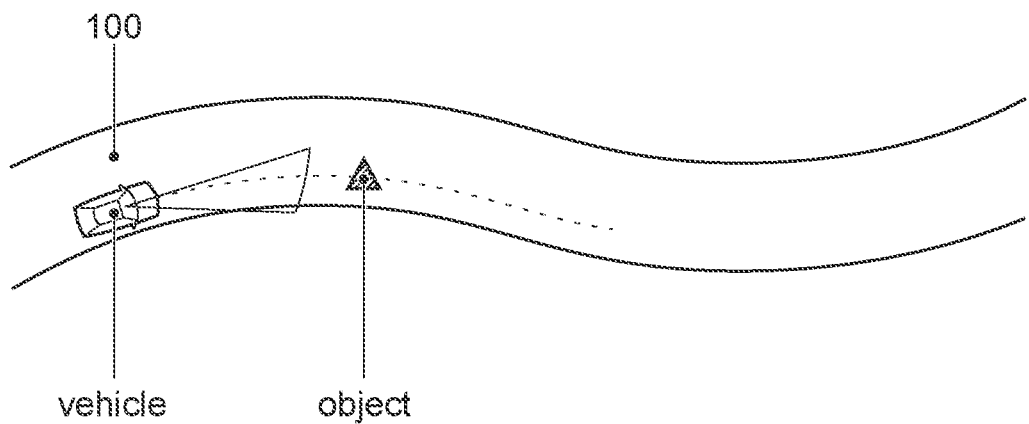
FIG. 4 illustrates uncertainties that may occur in an automated driving scenario.
Figure 4:
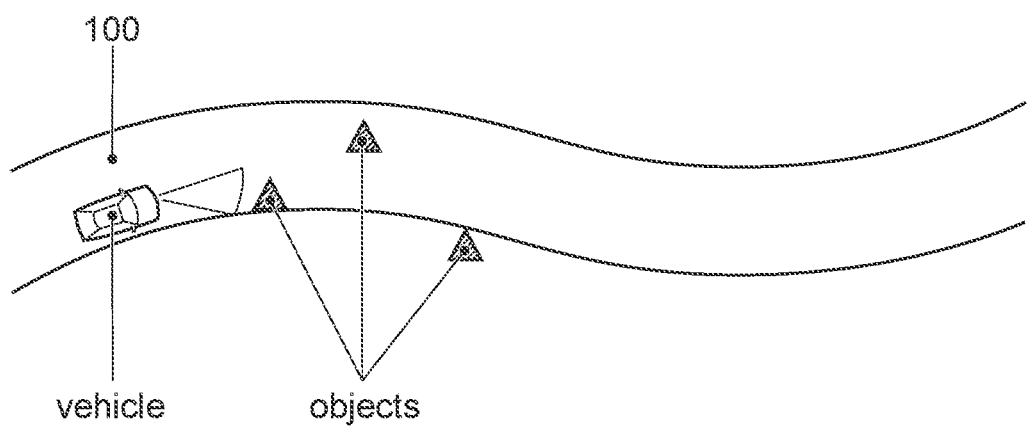

In a further disclosed embodiment, an automated transportation vehicle senses its environment with its own sensors. This environment is clustered into objects with certain properties like the location (x,y,z), size, speed, and movement direction. All objects and their parameters have a certain error probability in object detection: localization detection, false positive, false negative, classification errors, tracking error, trajectory prediction errors, etc. If a transportation vehicle drives through a dense urban area, it might need to reduce its speed because of misinterpretation of objects, or it may even have to stand still and might not be able to continue its drive. FIG. 4 shows two basic problems that may occur in such scenarios. FIG. 4 illustrates uncertainties that may occur in an automated driving scenario.

At the top FIG. 4 shows a scenario in which a transportation vehicle 100 drives on a street and an object is located there as well. The transportation vehicle 100 is trying to identify and classify the object based on its sensors but fails. The transportation vehicle 100 may then use an according broadcast message to get further information from another traffic entity in line with the above description. The message content may then correspond to a request to determine what kind of object is in front of the transportation vehicle or whether it is human or not. FIG. 4 shows another scenario at the bottom in which an object's (movement) profile is inaccurate. The transportation vehicle 100 drives through an area with 3 non-static (dynamic) objects. Depending on their location and the location of the sensing transportation vehicle 100 the accuracy of the movement profile of the three objects varies. The transportation vehicle 100 may use the broadcast message to receive further information from other traffic participants 200, 300 on one or more of the objects to improve the accuracy in its environmental model.

Communications can support the reduction of error probability in object and/or object property detection in the environmental model of automated transportation vehicles 100 even without sharing full sensor data. Wireless resources of wireless channels can therefore be used efficiently and a risk of an overload of the wireless channels may be reduced. Furthermore, disclosed embodiments may allow tailoring the broadcast message to distinct objects the transportation vehicle is unsure about and may avoid transmitting information on other objects the transportation vehicle 100 is not interested in and which are, for example, not crossing a future path of the transportation vehicle 100. Focusing on specific objects may support a reduction of the amount of transmitted data in a cooperative perception case. Further or enhanced classification of objects may be supported.

In further exemplary embodiments, a transportation vehicle 100 may ask other transportation vehicles 200 or infrastructure 300 for support to identify/classify and increase the correctness probability of certain objects with a Cooperation Request Message for Trajectory Crossing Object Classification (broadcast message). Disclosed embodiments are based on a request, which is sent through a broadcast message, e.g., the ego transportation vehicle 100 is not sure about the classification or the orientation/direction of an object and therefore may ask its surrounding (traffic entities 200, 300). Alternatively, in the case where the ego transportation vehicle 100 detected an object with potentially high localization error, the transportation vehicle 100 can request the other transportation vehicles 200, 300 to check specific areas. Therefore, this message is not requesting information about all objects in an area but for objects about which the transportation vehicle 100 is not sure and which might conflict with its planned future path. In some exemplary embodiments the method 10 may comprise transmitting the broadcast message if the at least one dynamic object conflicts with a future path of the transportation vehicle 100. By restricting potential message to those, which relate to conflicting objects, the signaling overhead (number of messages) may be reduced. As outlined above, other transportation vehicles 200 or traffic infrastructure 300 may only answer this request if they have data with higher confidence and correctness probability.

Figure 5:
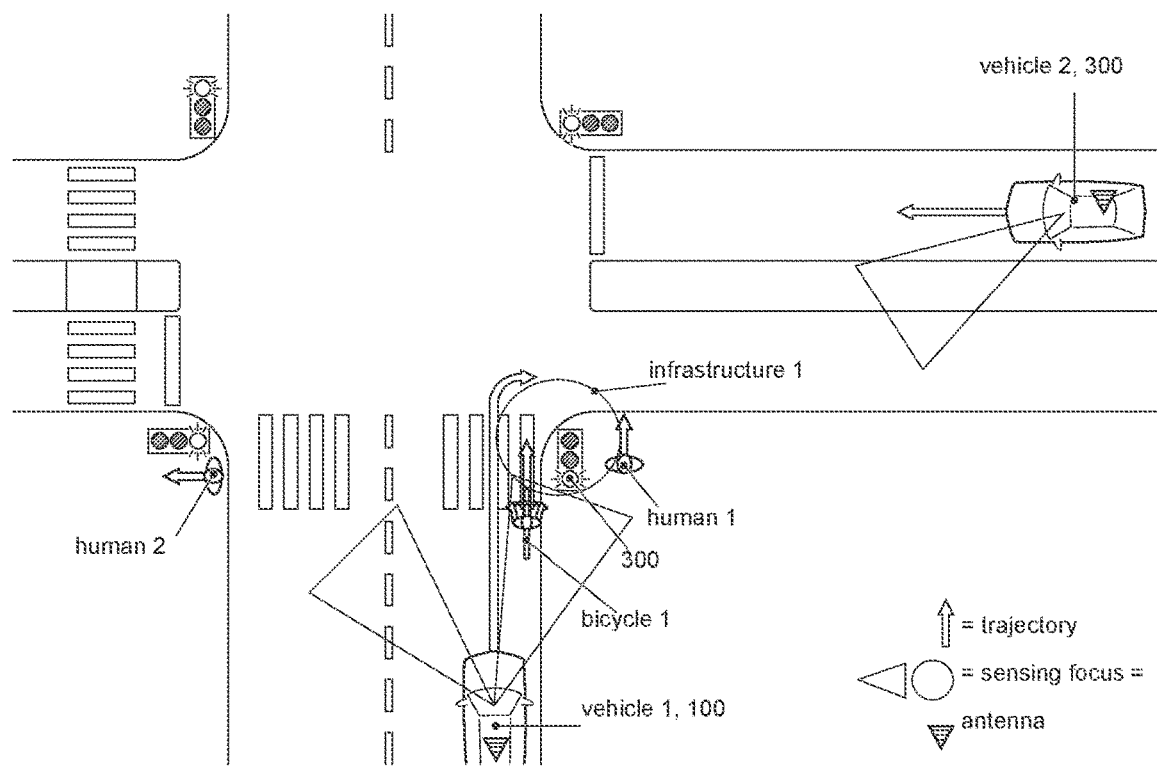
FIG. 5 shows an example scenario in which a cooperative communication request message for trajectory crossing object classification is used in an exemplary embodiment.

FIG. 5 shows an example scenario in which a cooperative communication request message for trajectory crossing object classification is used in an exemplary embodiment. FIG. 5 illustrates a situation at an intersection with a first transportation vehicle 100, a second transportation vehicle 200, a traffic light 300, two humans/pedestrians (human 1, human 2), and a bicycle (bicycle 1). The first transportation vehicle 100 is planning to turn to the right. Human 1 wants to cross the street even though there is no sidewalk to cross the street. Human 2 walks towards west after having crossed the road and bicycle 1 is heading towards north. Transportation vehicle 200 drives from east to west and the traffic light 300 with sensors and communication unit is located at the corner.

a) Transportation vehicle 100 senses its environment
 b) Transportation vehicle 100 knows its future direction
 c) Based on a) and b) Transportation vehicle 100 obtains a list like the table below:

| Object | Object detection probability | Conflict with future trajectory probability | Object classification [correctness probability] | Position xyz [correctness probability] | Movement profile [correctness probability] |
|---|---|---|---|---|---|
| 1 | 80% | 99% | "bicycle" [70%] | "xyz" [60%] | 15 km/h heading north [50%] |
| 2 | 60% | 85% | "unknown" | "xyz" [70%] | 4 km/h heading north [40%] |
| 3 | 80% | 2% | "unknown" | "xyz" [60%] | 5 km/h heading west [80%] |
| 4 | | | ... | | |

In this disclosed embodiment the method 10 as carried out at transportation vehicle 100 maintains a table/list at least with dynamic objects of the environment. The table/list comprises information related to an object detection probability (second column from the left) and information related to a probability of a future conflict of the path of the transportation vehicle with the object (third column from the left).

d) Transportation vehicle 100 has listed two objects (objects 1 and 2) with higher conflict occurrence probability with its own future planed path. Bicycle 1 and human 1 are walking away, therefore the prediction and tracking of the future trajectory of these objects is less reliable.

e) Transportation vehicle 100 now broadcasts a "Cooperation Request Message for Trajectory Crossing Object Classification". This message contains just the request for objects 1 and 2 (bicycle 1 and human 2) as well as their detected properties and the related confidence.

f) Infrastructure 1 (traffic light 300) and transportation vehicle 200 reply only if they can improve the transportation vehicle's 100 knowledge of object 1 or 2.

g) For instance, the infrastructure 1 (traffic light 300) does not respond as it has less certainty.

h) Transportation vehicle 200 answers the request because it has better understanding of their motion.

i) Transportation vehicle 100 can now update its list and adapt it planed future path.

In further exemplary embodiments the broadcast message may comprise at least one element of the group of a description of the at least one dynamic object, an identification of the at least one dynamic object, information related to a property (e.g., speed, direction, size, etc.) of the at least one dynamic object for which further information is requested, information related to a relative or an absolute location of the at least one dynamic object, information related to a specific area further information is requested on, and information related to the transportation vehicle's trajectory.

Based on such information specific messages on specific uncertainties in the environmental model can be generated.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for a transportation vehicle and for updating an environmental model of the transportation vehicle
12 obtaining an environmental model of the transportation vehicle
14 assigning information related to correctness probabilities at least to dynamic objects of the environmental model
16 determining at least one dynamic object for which the information related to the correctness probability indicates a correctness probability below a threshold
18 transmitting a broadcast message to the environment to request further information on the at least one dynamic object
20 method for a traffic entity and for updating an environmental model at a transportation vehicle
22 obtaining information related to an environmental model
24 receiving a broadcast message relating to a request for further information on at least one dynamic object in an environment of the transportation vehicle
26 providing further information one the at least one dynamic object in the environment of the transportation vehicle if available from the environmental model
30 apparatus for a transportation vehicle and configured to update an environmental model of the transportation vehicle
32 one or more interfaces
34 control module
40 apparatus for a traffic entity and configured to update an environmental model at a transportation vehicle
42 one or more interfaces
44 control module
100 transportation vehicle
200 transportation vehicle
300 traffic entity
400 mobile communication system

The invention claimed is:

1. An apparatus for a transportation vehicle configured to update an environmental model of the transportation vehicle, the apparatus comprising:
one or more interfaces for communicating with one or more transportation vehicles and traffic entities; and a control module including computer program code stored on a non-transitory computer readable medium and configured to be executed on a computer, processor, or programmable hardware component, the control module configured to:
obtain an environmental model of the transportation vehicle, the environmental model comprising static and dynamic objects in the environment of the transportation vehicle along at least a part of a trajectory of the transportation vehicle;
assign information related to correctness probabilities at least to dynamic objects of the environmental model, wherein the information includes an initial correctness probability indicative of a confidence on a determined object;
determine at least one dynamic object for which the initial correctness probability indicates a correctness probability below a threshold;
transmit a broadcast message to the environment to request further information on the at least one dynamic object;
receive at least one response message from another transportation vehicle or a traffic infrastructure entity in the environment with further information related to the at least one dynamic object, the further information including a further correctness probability indicative of a confidence on the determined object as determined by the other transportation vehicle or the traffic infrastructure entity;
evaluate whether the further correctness probability is greater than the initial correctness probability; and
automatically update the environmental model with the further information related to the at least one dynamic object only in response to the further correctness probability being greater than the initial correctness probability,
wherein the information and the further information of the dynamic objects is based at least in part on at least one sensor of at least one of the transportation vehicle and the another transportation vehicle configured to sense at least one of location, size, speed and movement direction of the dynamic objects.

2. The apparatus of claim 1, wherein the broadcast message comprises at least one element of the group of a description of the at least one dynamic object, an identification of the at least one dynamic object, information related to a property of the at least one dynamic object for which further information is requested, information related to a relative or an absolute location of the at least one dynamic object, information related to a specific area further information is requested on, and information related to the trajectory of the transportation vehicle.

3. The apparatus of claim 1, wherein the control module is further configured to transmit the broadcast message in response to the at least one dynamic object conflicting with a future path of the transportation vehicle, and/or maintaining a list at least with dynamic objects of the environment, wherein the list comprises information related to an object detection probability and information related to a probability to a future conflict of the path of the transportation vehicle with the object.

4. The apparatus of claim 1, wherein the broadcast message comprises information related to a future trajectory of the transportation vehicle for which the environmental model indicates no conflicting objects with a certain correctness probability, and wherein the request for further information on the at least one dynamic object seeks a warning in response to there being a conflicting object on the trajectory.

5. A traffic infrastructure component comprising the apparatus of claim 4.

6. A transportation vehicle comprising the apparatus of claim 1.

7. A computer program having a program code for performing operations to provide the functionality of the control module recited in claim 1, when the computer program is executed on a computer, a processor, or a programmable hardware component.

8. An apparatus for a traffic entity configured to update an environmental model at a transportation vehicle, the apparatus comprising:
one or more interfaces for communicating with one or more transportation vehicles and traffic entities; and
a control module including computer program code stored on a non-transitory computer readable medium and configured to be executed on a computer, processor, or programmable hardware component, the control module configured to:
obtain an environmental model of the transportation vehicle, the environmental model comprising static and dynamic objects in the environment of the transportation vehicle along at least a part of a trajectory of the transportation vehicle;
assign information related to correctness probabilities at least to dynamic objects of the environmental model, wherein the information includes an initial correctness probability indicative of a confidence on a determined object;
determine at least one dynamic object for which the initial correctness probability indicates a correctness probability below a threshold;
transmit a broadcast message to the environment to request further information on the at least one dynamic object;
receive at least one response message from another transportation vehicle or a traffic infrastructure entity in the environment with further information related to the at least one dynamic object, the further information including a further correctness probability indicative of a confidence on the determined object as determined by the other transportation vehicle or the traffic infrastructure entity;
evaluate whether the further correctness probability is greater than the initial correctness probability; and
automatically update the environmental model with the further information related to the at least one dynamic object only in response to the further correctness probability being greater than the initial correctness probability,
wherein the information and the further information of the dynamic objects is based at least in part on at least one sensor of at least one of the transportation vehicle and the another transportation vehicle configured to sense at least one of location, size, speed and movement direction of the dynamic objects.

9. The apparatus of claim 8, wherein the broadcast message comprises at least one element of the group of a description of the at least one dynamic object, an identification of the at least one dynamic object, information related to a property of the at least one dynamic object for which further information is requested, information related to a relative or an absolute location of the at least one dynamic object, information related to a specific area further information is requested on, and information related to the trajectory of the transportation vehicle.

10. The apparatus of claim 8, wherein the control module is further configured to transmit the broadcast message in response to the at least one dynamic object conflicting with a future path of the transportation vehicle, and/or maintaining a list at least with dynamic objects of the environment, wherein the list comprises information related to an object detection probability and information related to a probability to a future conflict of the path of the transportation vehicle with the object.

11. The apparatus of claim 8, wherein the broadcast message comprises information related to a future trajectory of the transportation vehicle for which the environmental model indicates no conflicting objects with a certain correctness probability, and wherein the request for further information on the at least one dynamic object seeks a warning in response to there being a conflicting object on the trajectory.

12. A method for a transportation vehicle and for updating an environmental model of the transportation vehicle, the method comprising:
obtaining, via a control module including computer program code stored on a non-transitory computer readable medium and configured to be executed on a computer, processor, or programmable hardware component, an environmental model of the transportation vehicle, the environmental model comprising static and dynamic objects in the environment of the transportation vehicle along at least a part of a trajectory of the transportation vehicle;
assigning, via the control module, information related to correctness probabilities at least to dynamic objects of the environmental model, wherein the information includes an initial correctness probability indicative of a confidence on a determined object;
determining, via the control module, at least one dynamic object for which the initial correctness probability indicates a correctness probability below a threshold;
transmitting, via the control module, a broadcast message to the environment to request further information on the at least one dynamic object;
receiving, via the control module, at least one response message from another transportation vehicle or a traffic infrastructure entity in the environment with further information related to the at least one dynamic object, the further information including a further correctness probability indicative of a confidence on the determined object as determined by the other transportation vehicle or the traffic infrastructure entity;
evaluating, via the control module, whether the further correctness probability is greater than the initial correctness probability; and
automatically updating the environmental model, via the control module, with the further information related to the at least one dynamic object only in response to the further correctness probability being greater than the initial correctness probability,
wherein the information and the further information of the dynamic objects is based at least in part on at least one sensor of at least one of the transportation vehicle and the another transportation vehicle configured to sense at least one of location, size, speed and movement direction of the dynamic objects.

13. The method of claim 12, wherein the broadcast message comprises at least one element of the group of a description of the at least one dynamic object, an identification of the at least one dynamic object, information related to a property of the at least one dynamic object for which further information is requested, information related to a relative or an absolute location of the at least one dynamic object, information related to a specific area further information is requested on, and information related to the trajectory of the transportation vehicle.

14. The method of claim 12, further comprising transmitting the broadcast message in response to the at least one dynamic object conflicting with a future path of the transportation vehicle, and/or maintaining a list at least with dynamic objects of the environment, wherein the list comprises information related to an object detection probability and information related to a probability to a future conflict of the path of the transportation vehicle with the object.

15. The method of claim 12, wherein the broadcast message comprises information related to a future trajectory of the transportation vehicle for which the environmental model indicates no conflicting objects with a certain correctness probability, and wherein the request for further information on the at least one dynamic object seeks a warning in response to there being a conflicting object on the trajectory.

16. A method for a traffic entity and for updating an environmental model at a transportation vehicle, the method comprising:

obtaining, via a control module including computer program code stored on a non-transitory computer readable medium and configured to be executed on a computer, processor, or programmable hardware component, information related to an environmental model at the traffic entity, the environmental model at the traffic entity comprising static and dynamic objects in an environment of the traffic entity;

receiving, via the control module, a broadcast message relating to a request for further information on at least one dynamic object in an environment of the transportation vehicle;

assigning, via the control module, information related to correctness probabilities at least to the dynamic objects of the environmental model at the traffic entity, wherein the information related to correctness probabilities indicates a confidence on a determined object;

receiving, via the control module, information related to the at least one dynamic object at the traffic entity, the information including an initial correctness probability;

acquiring, via the control module, further information related to the at least one dynamic object in the environment of the transportation vehicle, the further information including a further correctness probability; and automatically updating the environmental model at the transportation vehicle, via the control module, with the further information related to the at least one dynamic object only in response to the further correctness probability being greater than the initial correctness probability, wherein the information and the further information of the dynamic objects is based at least in part on at least one sensor of at least one of the transportation vehicle and the another transportation vehicle configured to sense at least one of location, size, speed and movement direction of the dynamic objects.

17. The method of claim 16, wherein the broadcast message comprises information related to a future trajectory of the transportation vehicle for which no conflicting objects are present with a certain correctness probability, and wherein the further information on the at least one dynamic object comprises a warning in response to there being a conflicting object on a trajectory with a certain probability.

* * * * *